Figure 5:
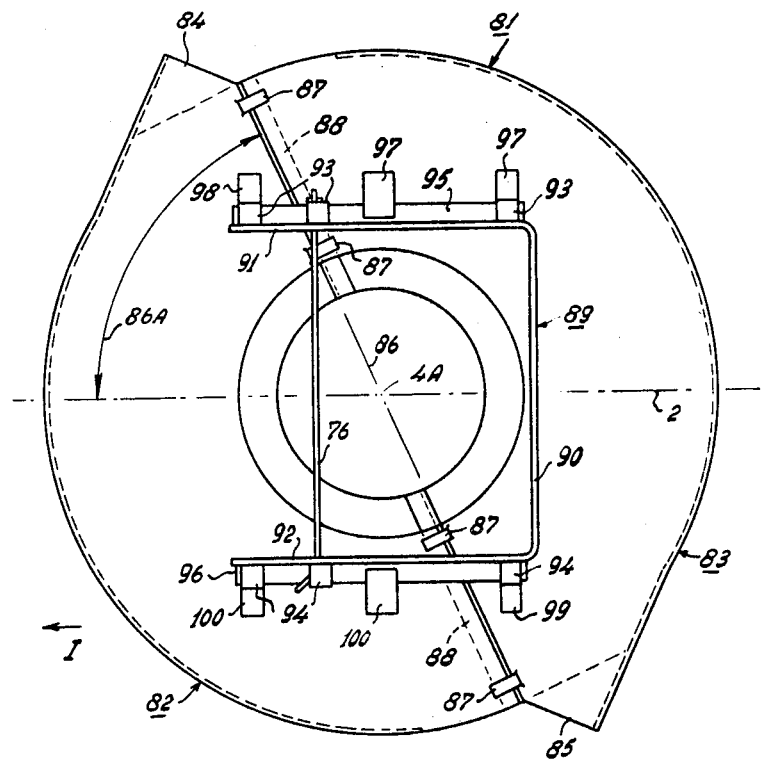

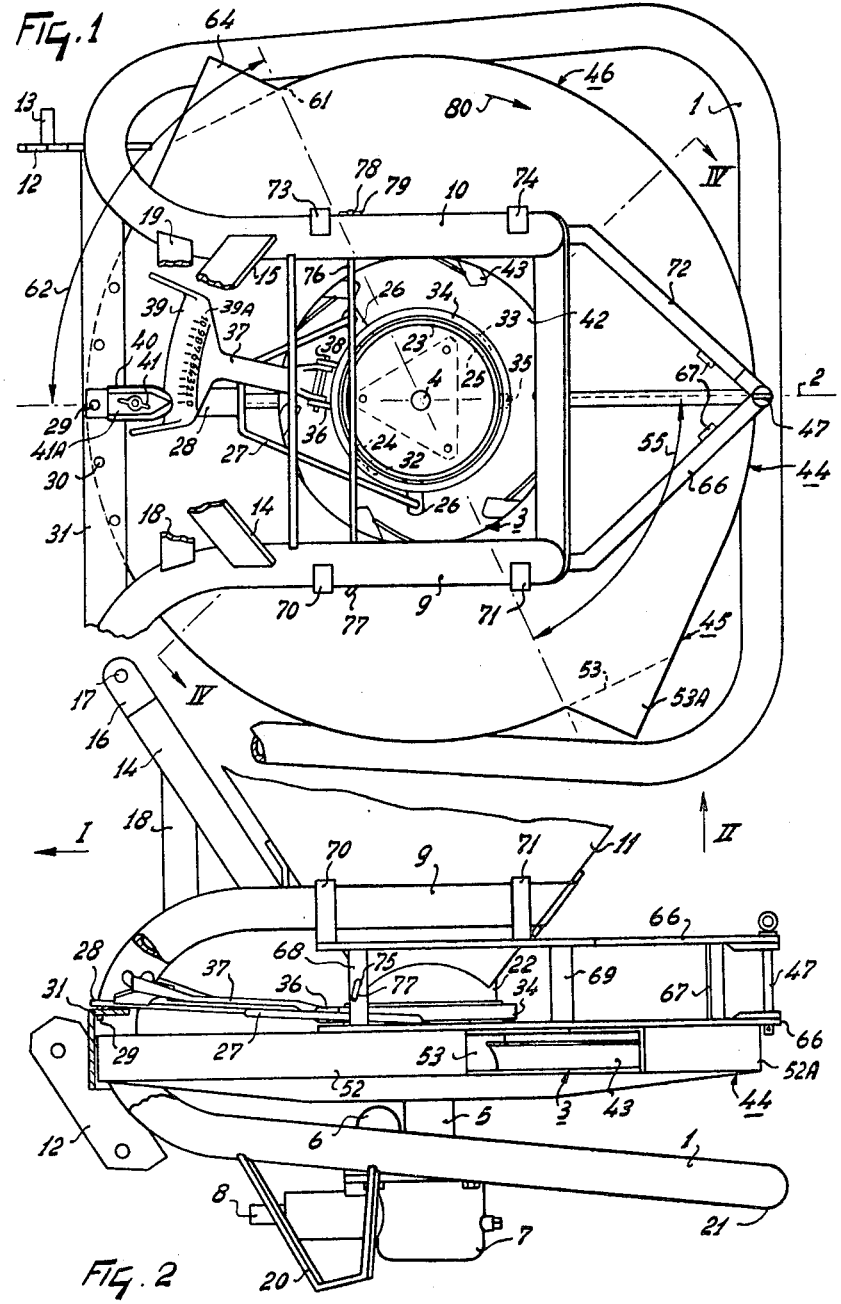

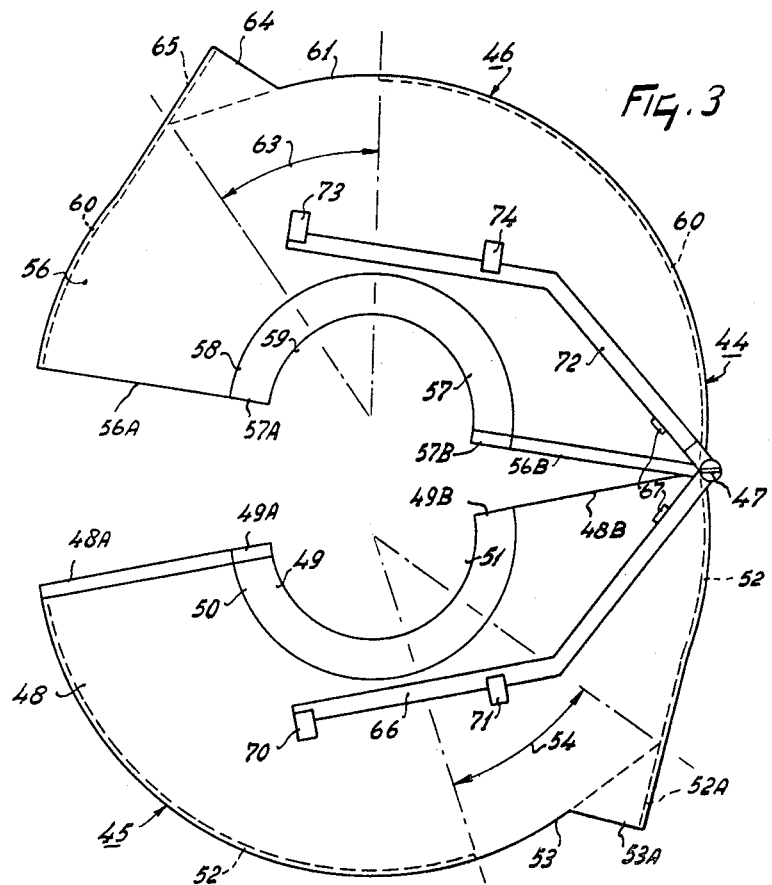
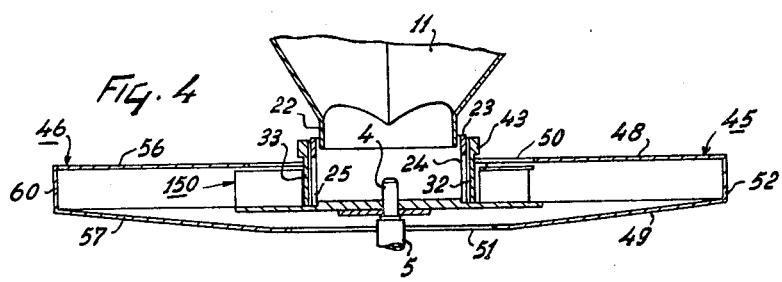

Oct. 5, 1965     C. VAN DER LELY ETAL     3,210,084
DEVICES FOR SPREADING GRANULAR OR POWDERY MATERIAL
Filed Jan. 8, 1963     6 Sheets-Sheet 4
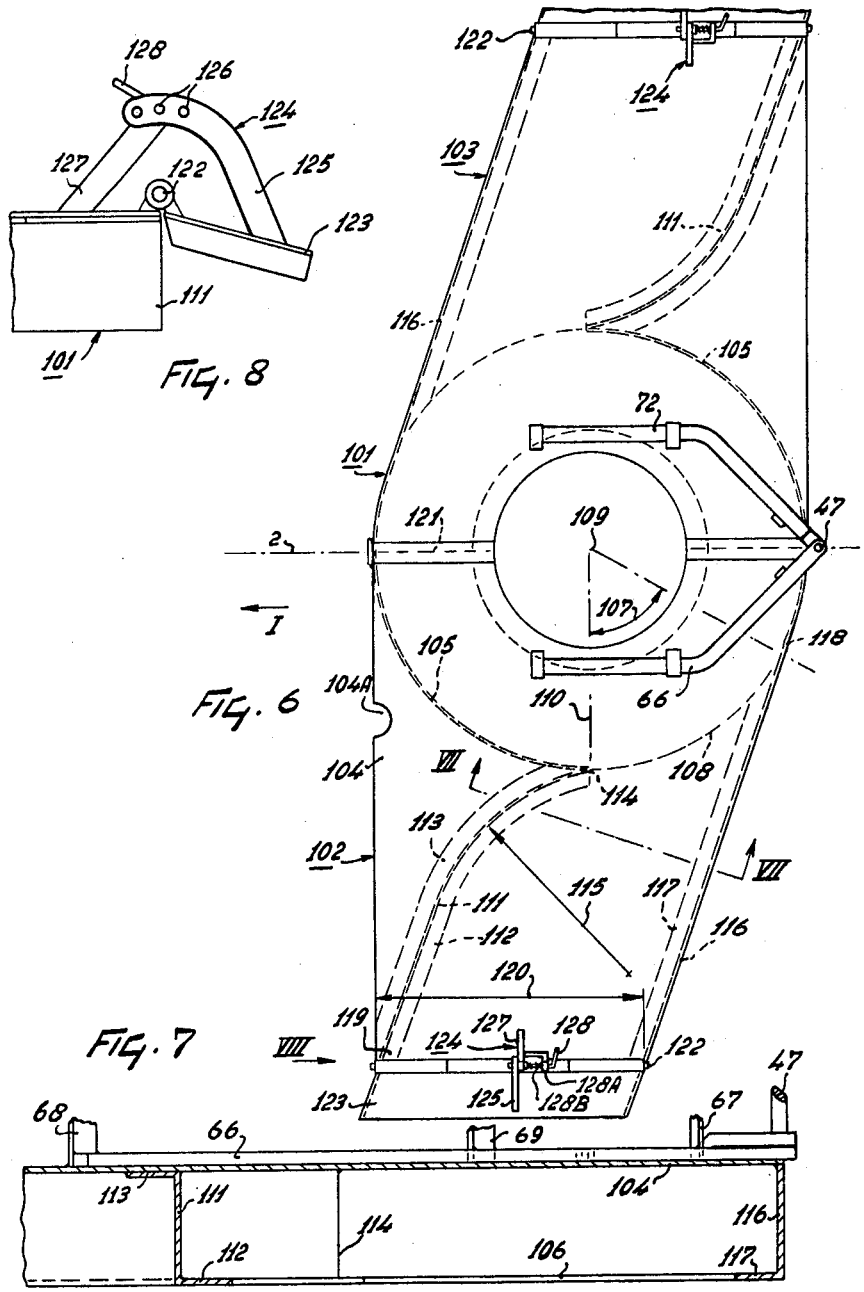
INVENTORS
CORNELIS & ARY VAN DER LELY
BY
Mason, Mason & Albright
Attorneys Oct. 5, 1965    C. VAN DER LELY ETAL    3,210,084
DEVICES FOR SPREADING GRANULAR OR POWDERY MATERIAL
Filed Jan. 8, 1963    6 Sheets-Sheet 5
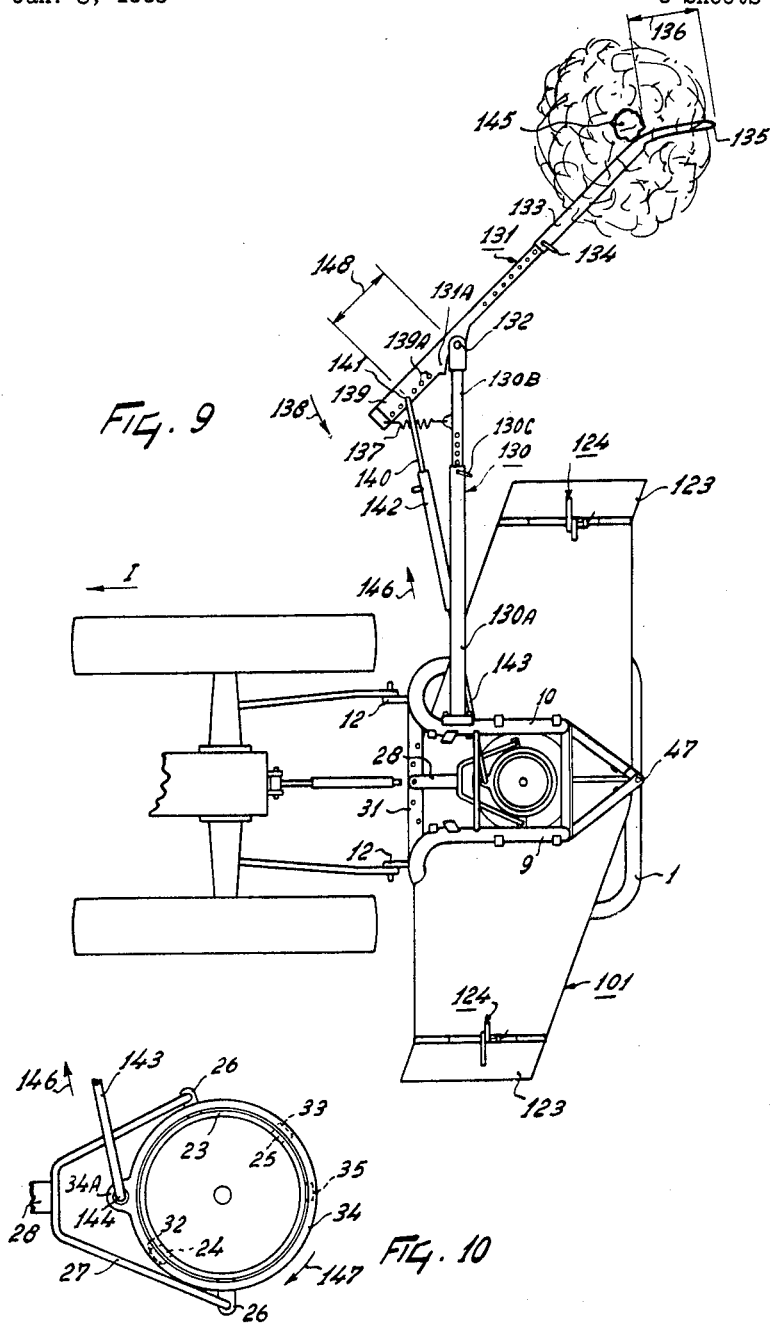
INVENTORS
CORNELIS & ARY VAN DER LELY
BY
Mason, Mason & Albright
Attorneys Oct. 5, 1965 C. VAN DER LELY ETAL 3,210,084
DEVICES FOR SPREADING GRANULAR OR POWDERY MATERIAL
Filed Jan. 8, 1963 6 Sheets-Sheet 6
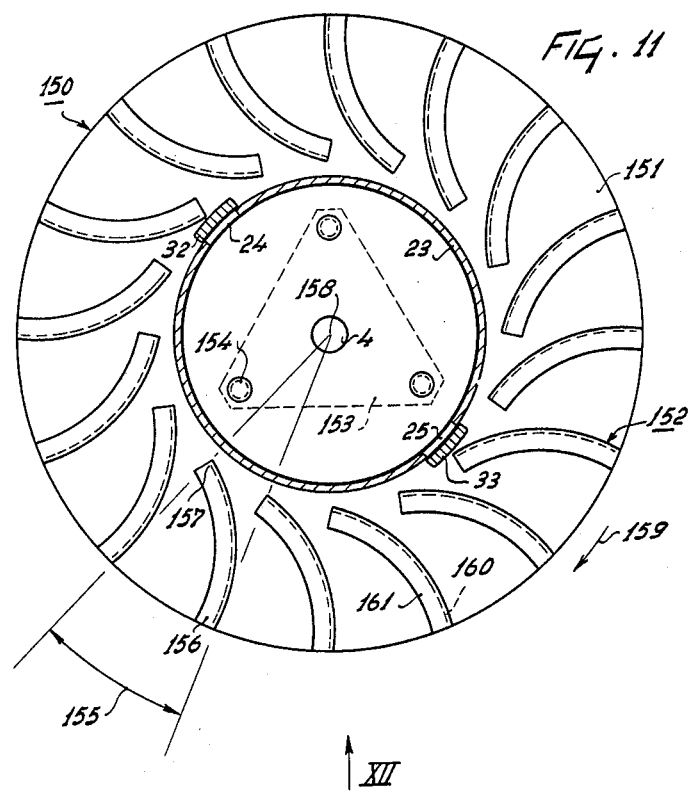
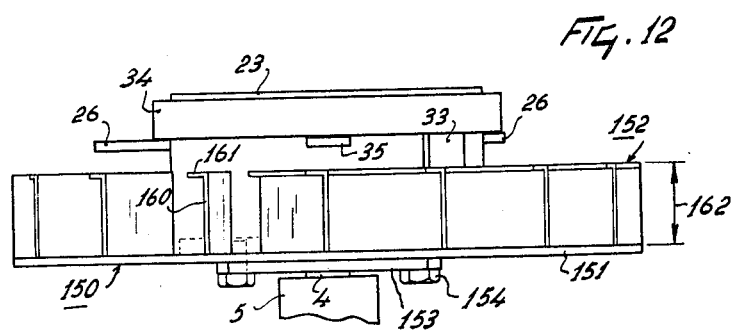
INVENTORS
CORNELIS & ARY VAN DER LELY
BY
Mason, Mason & Albright
ATTORNEYS _United States Patent Office_ 3,210,084
Patented Oct. 5, 1965

3,210,084
DEVICES FOR SPREADING GRANULAR OR POWDERY MATERIAL
Cornelis van der Lely, Zug, Switzerland, and Ary van der Lely, Maasland, Netherlands, assignors to C. van der Lely N.V., Maasland, Netherlands, a Dutch limited-liability company
Filed Jan. 8, 1963, Ser. No. 250,174
Claims priority, application Netherlands, Jan. 16, 1962, 273,620
8 Claims. (Cl. 275—8)

This invention relates to a device for spreading granular or powdery material, the device being of the kind comprising a frame movable over the ground, and a material container mounted on said frame and having at least one outlet port for enabling the material to be delivered in operation to a rotatable spreading member.

An object of the invention is to devise a simple device of the kind set forth, with the aid of which the material can be spread on two separate strips of ground during operation of the device.

According to a first aspect of the present invention, there is provided a device of the kind set forth, wherein a guide member for the material is arranged around the spreading member, the guide member having two and only two, distributing openings or groups of distributing openings formed therein for allowing the material to be thrown out of the guide member by the spreading member, said distributing openings or groups of distributing openings being offset about the rotary axis of the spreading member by an angle equal or substantially equal to 180°.

Advantageously, the guide member has a circular guide rim arranged around the outer circumference of the spreading member and centered on the rotary axis of the spreading member, the rim being interrupted at two places for defining wholly or partly the distributing openings of the guide member.

According to a second aspect of the present invention there is provided a device of the kind set forth, wherein the spreading member has at least twelve arms for spreading and ejecting the material, the arms extending in an outward direction with respect to the rotary axis of the spreading member and being arranged so that, in operation, their inner ends pass close to the outlet port or ports, the spreading arms being curved as seen in the direction of the rotary axis of the spreading member. This construction of the spreading member and the relative positioning of the outlet ports and spreading arms, permit of supplying the material to the spreading member and of guiding it via the spreading arms to the circumference of the spreading member in such a way that it can be ejected in relatively accurately determined directions on to the strips of ground to be treated by the material.

According to a third aspect of the present invention there is provided a device of the kind set forth, wherein each outlet port is provided with a movable closing member, there being means in connection with the closing member for regulating the movement thereof for opening and closing the outlet port, the regulating means being arranged so that in operation, the outlet port is opened and closed in turn at intervals, whereby the regulating means controls the delivery of material in operation to the spreading member.

Advantageously, the regulating means includes an arm projecting laterally from the device, on which arm a control mechanism is movably arranged, this mechanism being associated with resilient means which tends to hold the mechanism in a fixed position relative to the arm, the mechanism being movable out of such position against the action of the resilient means when a part of the control mechanism comes into contact with a tree or other object, the control mechanism being coupled with the closing member for regulating the opening and closing of the outlet port. A spreading device thus constructed permits for example of controlling the distribution of the material in accordance with the positions of trees or the like on the ground, so that material, such as fertilizer is spread only in the close proximity of the trees or the like.

For a better understanding of the invention and to show how the same may be readily carried into effect, reference will now be made by way of example to the accompanying drawings, in which:

FIGURE 1 is a plan view of a first embodiment of a spreading device of the kind set forth, the container thereof being omitted, FIGURE 2 is a part-sectional side elevation of the device as seen in the direction of the arrow II in FIGURE 1, FIGURE 3 is a plan view of the guide member, FIGURE 4 is a section of part of the device taken on the line IV—IV in FIGURE 1, FIGURE 5 is a plan view of a second embodiment of the guide member, FIGURE 6 is a plan view of a third embodiment of the guide member, FIGURE 7 is on an enlarged scale a section of part of the guide member of FIGURE 6, taken on the line VII—VII in FIGURE 6, FIGURE 8 is on an enlarged scale an elevation of a detail of the guide member of FIGURE 6, as seen in the direction of the arrow VIII in FIGURE 6, FIGURE 9 is a plan view of a second embodiment of a spreading device of the kind set forth, FIGURE 10 is on an enlarged scale a plan view of a detail of the second embodiment shown in FIGURE 9, FIGURE 11 is on an enlarged scale a plan view of a modification of part of the first embodiment of the spreading device, and FIGURE 12 is an elevation of the part shown in FIGURE 11, as seen in the direction of the arrow XII in FIGURE 11.

Referring first to FIGURES 1 and 2, the device there shown has a curved frame beam 1, which is symmetrical about a vertical plane 2 extending in the intended direction of operative travel of the device (indicated by the arrow I). The device is provided with a spreading and ejector member 3 which is fastened to a vertical shaft 4. The latter is journalled in a bearing sleeve 5, secured to a frame beam 6 which is connected with a frame beam 1. The shaft 4 is coupled via a gear wheel transmission, which is arranged in a gear box 7, to a shaft 8, which can in turn be coupled with the power take-off of, for example, a tractor to which the device may be attached.

The frame beam 1 has ends 9 and 10, which are located above the ejector member 3 and support a container 11 (not shown in FIGURE 1). At its two most forward points (with reference to the direction I), the frame beam 1 is provided with two plates 12, which are symmetrical about the plane 2, only one plate being shown in FIGURE 1. To each plate 12 is fastened a pin 13, the pins being arranged to be fastened to the lower arms of the three-point lifting device of a tractor. Two obliquely ascending strips 14 and 15 are fastened near the ends 9 and 10 of the frame of the device, the upper ends 16 of these strips being parallel and slightly spaced apart. The ends 16 of the strips 14 and 15 are formed with registering holes 17, so that the ends 16 can be coupled with the upper arm of the lifting device of the tractor with the aid of a pin passed through the holes 17 and through the end of such upper arm. The fastening of the strips 14 and 15 to the frame beam 1 is reinforced by struts 18 and 19.

On the lower side, the frame beam 1 is provided with two supports 20, which are located one on each side of the device and symmetrical about the plane 2. The supports 20 serve as feet, the device being supported thereon when it is not attached to the lifting device of the tractor. When resting on the ground, the device contacts the ground by the supports 20 and the lower side 21 of the rearmost part of the beam 1.

The bottom of the container has an outlet spout 22, which is surrounded by an annulus 23 so that this annulus is freely turnable about the spout 22 and rests on the ejector disc 3. The annulus 23 is formed with two outlet ports 24 and 25, which are offset relatively to each other by an angle of about 180° about the shaft 4. The annulus 23 is held by an adjusting and fixing mechanism, which includes two lugs 26 fastened to the annulus 23, and a curved stirrup-like bar 27 attached to these lugs. The bar 27 is provided with a control arm 28 having a pin 29 at its free end, which pin can be inserted into any desired hole of a number of holes 30 in a beam 31, secured to the frame 1. The outlet ports 24 and 25 can be shut to a greater or lesser extent with the aid of closing members formed by masking plates 32 and 33, which are fastened to an annulus 34 surrounding the annulus 23. The annulus 34 rests on the lugs 26 and on a pin 35 fastened to the annulus 23. The position of the masking plates 32 and 33 with respect to the annulus 23 can be adjusted and fixed by an adjusting mechanism controlling the annulus 34. The adjusting mechanism comprises an arm 37, which is pivoted about a horizontal pin 38 to a pair of lugs 36 fastened to the annulus 34. The free end of the arm 37 is enlarged to form an arcuate plate 39 centered on the shaft 4 and marked with a scale division 39A. The plate 39, and hence the annulus 34 and the masking plates 32 and 33, can be fixed in any one of a plurality of positions relative to the annulus 23 by a clamping mechanism 40, which is fastened to the arm 28. The plate 39 can be clamped to the arm 28 with the aid of a wing nut 41 associated with the clamping mechanism, the wing nut being arranged to be tightened down on to a clamping plate 41A.

The ejector member 3 comprises a horizontal, circular disc 42, to which is attached a number of horizontal, curved ejector arms 43, projecting beyond the periphery of the disc. The disc 42 is surrounded by a guide member 44. The latter consists of two identical parts 45 and 46 of essentially semi-circular plan, the parts being pivoted to each other by a vertical hinge pin 47 (see also FIGURE 3, which shows the parts 45 and 46 pivoted outwardly from each other about the axis of the pin 47). The part 45 has an upper, horizontal plate 48, and a lower plate 49 which constitutes half of a truncated cone, the apex of which points downwardly (see FIGURE 4). The plate 48 is formed with a semi-circular opening 50 and the plate 49 has a semi-circular opening 51, the opening 50 being slightly larger than the opening 51. The plates 48 and 49 are interconnected at their peripheries by a vertical guide rim 52 which is concentric with the shaft 4. The rim 52 is located on the circumference of the circular area swept out by the ejector arms 43 when the ejector member 3 is rotating in operation. The rim 52 has an outlet area comprising opening 53 which extends over an angle 54 of approximately 35° about the shaft 4, and which, with reference to the intended direction of travel I, is on the left-hand side of the plane 2 and slightly behind the shaft 4. The center of the opening 53 is spaced from the plane 2 by an angle 55 of approximately 65° about the shaft 4. At the location of the opening 53, there is a short nozzle 53A, which protrudes from about half of the opening 53. The nozzle 53A has a vertical rim 52A, which is tangential to the rim 52. The rim 52A extends forwardly and to the left from its connection with the rim 52 (with reference to the direction I).

The part 46 is constructed similarly to the part 45 and comprises a semi-circular, horizontal, upper plate 56 and a lower plate 57. The plate 56 has a semi-circular opening 58 and the plate 57 has a semi-circular opening 59. The plates 56 and 57 are connected with each other by a vertical, upright guide rim 60, in which an opening 61 is formed, the opening extending through an angle 63 of approximately 35° about the shaft 4. The center of the opening 61 is located at an angle 62 of approximately 65° about the shaft 4 to the right-hand side of the plane 2 and in front of the shaft 4, with reference to the direction I. A short nozzle 64 extends away from approximately half of the opening 61 and has a vertical rim 65 which is tangential to the rim 60 so that the rim 60 extends away from the rim 60 to the right and obliquely to the rear.

It will be seen, therefore, that the guide member 44 has two distributing openings 53 and 61, which are spaced apart about the shaft 4 by an angle of approximately 180° (FIGURE 1). The parts 45 and 46 join each other along a line which is mainly located in the plane 2. The part 45 is constructed so that the plates 48 and 49, on one side of the shaft 4, have stepped edges 48A and 49A, respectively, below which fit the flat edges 56A and 57A of the plates 56 and 57, respectively. The part 46 is constructed so that, on the other side of the shaft 4, there are similarly stepped edges 56B and 57B of the plate 56 and 57, below which fit the flat edges 48B and 49B of the plates 48 and 49, respectively.

The guide member 44 is suspended on the ends 9 and 10 of the frame beam 1.

For this purpose, two strips 66 are fastened to the part 45 of the guide member, the strips 66 lying one above the other, and being interconnected near the vertical hinge pin 47 by a tie 67 and near the central part of the plate 48 by ties 68 and 69 (FIGURE 2). On its upper side, the upper strip 66 carries two brackets 70 and 71, which extend over the end 9 of the beam 1. The part 46 is similarly provided with strips 72, the upper strip 72 carrying brackets 73 and 74, which fit over the end 10 of the beam 1. The tie 68 and the corresponding tie on the part 46 are formed with aligned holes 75, in which a rod 76 is removably accommodated. The rod 76 is bent at one end to form a handle 77, the other end being formed with a hole 78, through which a split pin 79 can be passed, so that the two parts 45 and 46 are secured against relative pivotal movement about the pin 47. The rod 76 extends along the container wall near the lower side thereof, whereas the forward side of the guide member is located very near to the beam 31 of the frame (FIGURE 2), the guide member being thus secured against movement relative to the frame.

For operation the spreading device is attached to the lifting device of a tractor or the like and is propelled in the direction of the arrow I over the field to be treated. The material to be spread is placed in the container 11. The shaft 8 is coupled via an intermediate shaft with the power take-off shaft of the tractor or the like, so that the ejector member 3 is rotated in the direction of the arrow 80 (FIGURE 1). For ejecting the material, the plates 32 and 33 are moved from the outlet ports 24 and 25 to a greater or lesser extent in accordance with the quantity of material to be spread per unit of length to be covered. This movement is attained by displacing the plate 39 over the arm 28 and clamping it in the desired position. The extent to which the ports 24 and 25 are uncovered can be read from the scale division 39A marked on the plate 39.

When the ports 24 and 25 are wholly or partly open and the ejector member is rotating, the material is fed to the distributing arms 43 which throw the material through the distributing openings 61 and 53 of the guide member 44 in approximately opposite directions, so that the material falls to the ground on both sides of the device. In order to attain optimum passage of the material through the openings 61 and 53, the positions of the ports 24 and 25 about the shaft 4 can be adjusted so that the material reaches the outer ends of the blades 43 when such ends are near the openings 61 and 53, respectively, and the material can be thrown directly from the distributing arms through the openings. The outlet ports 24 and 25 can be so adjusted by moving the arm 28 and inserting the pin 29 into a different hole 30 in the beam 31. The material reaching the ends of the distributing arms 43, prior to its arrival at the distributing openings 61 and 53, is guided to the openings by the rims 60 and 52, respectively. Owing to the adjustability of the outlet ports 24 and 25 about the shaft 4, the positions of the ports can be chosen to suit the nature of the material to be spread, so that irrespective of the kind of material spread, the major part thereof always reaches the outer ends of the arms 43 near the distributing openings 61 and 53, the need for guiding along the rims 52 and 60 being thus minimized.

The guide member 44 can be removed from the device by releasing the split pin 79 from the rod 76 and by withdrawing the rod 76 from the holes 75. The halves 45 and 46 of the guide member can then be turned relatively to each other about the vertical pivot pin 47, so that the guide member is opened out sufficiently to clear the ejector member 3 and can be removed from the device. It will be apparent that the guide member is mounted on the device by carrying out these operations in the reverse order.

With the aid of the guide member 44, the device can be used for spreading successfully fertilizers, for example, on fields where crops are cultivated in rows which are relatively widely spaced from one another. The guide member may be used successfully for example in a coffee plantation.

FIGURE 4 has been drawn to show that an alternative form of ejector member may be employed. The ejector member depicted in FIGURE 4 and designated by the reference numeral 150, is described in detail with reference to FIGURES 11 and 12.

FIGURE 5 shows a second embodiment of the guide member, designated by the reference numeral 81. The guide member 81 comprises two parts 82 and 83, which are identical in shape and join each other along a line which is diametrical to the axis 4A of the shaft. The guide member formed by the joined parts 82 and 83 has the same external shape as the guide member 44, and is therefore not shown in full. Each of the parts 82 and 83 of this guide member 81 also has an upper plate and a lower plate, the plates being connected with each other by a vertical rim which is centered on the axis 4A of the shaft. The rims define two distributing openings 84 and 85. The openings 84 and 85 have the same positions relative to the shaft as the openings 61 and 53. The difference between the guide members 44 and 81 consists in that the parts 44, 45 and 82, 83 of the members are of differing constructions.

The parts 82 and 83 are not hinged to each other, so that, when they are detached from the device, they form two separate portions. The parts 82 and 83 join each other along a line 86, which is at an angle 86A of about 65° to the vertical plane 2, this line 86 extending from the center of the opening 84 to the center of the opening 85 and passing through the axis 4A of the shaft.

The part 82 is formed on one side of the axis 4A, and the part 83 is formed on the other side thereof, with a downwardly-stepped edge 88. Each part has a pair of horizontal lugs 87 fixed thereto so as to extend above the stepped edge 88. The edges of the parts joining the stepped edges 88 are flat and are slipped in between the corresponding lugs 87 and the stepped edges. The parts 82 and 83 are fixedly interconnected by a connecting member 89. The connecting member comprises a generally U-shaped strip 90 having two parallel limbs 91 and 92, which are located, when the guide member is mounted on the device, above the ends 9 and 10 of the frame beam 1. The limb 91 provided with three downwardly orientated brackets 93, each of which has a curved portion near the limb 91. When the guide member is mounted on the device, the curved portions of the brackets 93 fit around the end 10 of the frame beam 1. The limb 92 is similarly provided with three brackets 94 arranged to fit over the end 9 of the frame beam 1. At their lower ends, the brackets 93 are interconnected by a strip 95, and the brackets 94 by a strip 96, the strips being parallel to and just below the limbs 91 and 92. The strip 95 is located below two lugs 97 fastened to the part 83, and a lug 98 fastened to the part 82. The strip 96 is located below a lug 99 and two lugs 100 fastened to the parts 83 and 82 respectively, of the guide member 81. One strip 93 and one strip 94 are formed with aligned holes through which the rod 76 can be passed in order to fasten the guide member 81 to the device in the same manner as the member 44. Having mounted the guide member 81 on the ends 9 and 10 of the beam 1, it is used in the same manner as the guide member 44.

FIGURES 6, 7 and 8 show a third embodiment of the guide member, designated by the reference numeral 101 in FIGURE 6, which guide member can be fitted around the ejector member 3. The guide member 101 comprises two identical parts 102 and 103, which are joined to each other and are coupled with the frame in the same manner as the parts 45 and 46 of the guide member 44. The various members of the coupling means are therefore denoted by the same reference numerals as the corresponding members in FIGURES 1, 2 and 3. The part 102 of the guide member 101 comprises a trapezoidal upper plate 104 having two parallel sides 119 and 121, the larger of which coincides with the plane 2 when it is in the position in which it is mounted on the device. Such longer side is designated by the reference numeral 121. The front side of the plate 104 (with reference to the intended travelling direction I) is at right angles to the plane 2 and has a small recess 104A for accommodating the frame beam 1. On the lower side of the plate 104 there is provided a rim 105, which is vertical and concentric with the mid-point 109 of the side 121 of the trapezoidal plate 104. The vertical rim 105 is joined at its lower edge to a semi-circular plate 106 (FIGURE 7). The rim 105, although extending in a semi-circle, is interrupted over an angle 107 of about 65°, so that between the plates 104 and 106 a distributing port 108 is formed. One side 114 of the distributing port 108 is so arranged that the line of connection 110 between the side 114 and the point 109 is perpendicular to the plane 2. On the lower side of the plate 104 there is also fixed a rim 111, which is bent over at its upper and lower edges in opposite directions (see FIGURE 7), thereby to form horizontal flanges 112 and 113. The latter flange is secured to the lower side of the plate 104. The part of the rim 111 near the side 114 is bent into a circular arc having a radius 115, which is approximately equal to the radius of the vertical guide rim 105. As will be seen from FIGURE 6, the arcuate rim 105 extends forwardly from the side 114 and curves in one direction, whereas the arcuate part of the rim 111 extends forwardly from the side 114 and curves in the opposite sense. The rear side of the plate 104 is provided with a downwardly extending straight rim 116, which is bent forwardly at the lower edge to form a horizontal flange 117. The flanges 117 and 112 extend towards each other and are parallel to the plate 104. The rim 116 is tangential to the rim 105 at the side 118 of the port 108. The straight part of the rim 111 is parallel to the rim 116. The space between the rims 116 and 111 constitutes a prolongation of the guide member and constitutes an outlet nozzle for the distributing port 108. The side 119 of the plate 104 located at the mouth of the outlet nozzle has a length 120, which is approximately two thirds of the length of the side 121 of the plate 104. The outlet nozzle, formed by the plate 104 and the rims 111 and 116, is orientated away from the port 108 to the left and slightly to the front, with respect to the intended travelling direction I. Owing to the curved shape of part of the rim 111 the width of the nozzle increases over a first portion, in an outward direction, and remains constant over a second portion. At the edge 119, the plate 104 is provided with a guide flap 123, which is arranged to turn about a horizontal shaft 122 and can be fixed as desired in one of a number of positions with the aid of a locking mechanism 124 (shown in elevation in FIGURE 8). The mechanism 124 comprises a curved bracket 125 fastened to the flap 123 and having a plurality of holes 126 centered on the axis of the shaft 122, and also an arm 127 fixed on the plate 104. The arm 127 has a single hole in its upper end for registering with a hole in the bracket 125. The latter can be moved with respect to the arm 127 and can be fixed with respect thereto by passing a pin 128 through one of the holes 126 and through the hole in the arm 127. The pin is accommodated in a hole in a bracket 128A on the arm 127, and is resiliently urged by a spring 128B into the hole 126. The side edges of the flap 123 extend, as seen in plan, in line with the rims 111 and 116.

The part 103 is shaped in the same form as the part 102, but it is, as it were, turned through 180° about the point 109 from the position occupied by the part 102. For this reason there is no recess corresponding to the recess 104A. The various features of the part 103 are designated by the same reference numerals as the corresponding features of the part 102. The outlet nozzle of the part 103 is orientated, relatively to the direction I, to the right and slightly to the rear.

The plates 104 and 106 of the part 102 and the corresponding plates of the part 103, like the plates of the guide member 44, are formed with semi-circular openings fitted around the central shaft and the bottom of the container. The opening in the upper plates of the guide member 101, however, is smaller than the opening in the lower plates thereof.

During the operation of a device having the guide member 101, the material is ejected through the respective outlet ports 108 of the parts 102 and 103 by the ejector member 3, the ejected material being guided, beyond the ports 108, by the distributing nozzles formed by the plates 104 and the rims 111 and 116. At the ends of the nozzles, the material moving immediately below the plates 104 towards the edges 119, is guided downwardly by the guide flaps 123. It will be appreciated, however, that this embodiment of guide member may alternatively be used without guide flaps 123.

Referring now to FIGURES 9 and 10, there is shown a second embodiment of a spreading device, this device having the guide member 101 just described, and being attached to a tractor. The container has been removed, and the upper link of the three-point lifting device has been shown broken away, for the sake of clarity. In FIGURES 9 and 10, the same reference numerals are used for parts corresponding to the reference numerals in the previously described figures.

The guide member 101 in this embodiment of spreading device is provided with a regulating member, which automatically opens and closes the outlet ports 24 and 25 as required. This regulating member comprises a telescopic arm 130 fastened to the frame beam 1 and extending laterally therefrom, the outer end of the arm being provided with a control mechanism 131 which is pivotable about a vertical pin 132. The arm 130 comprises two portions 130A and 130B, which are relatively slidable and are fixable in a plurality of positions by a locking pin 130C.

The control mechanism 131 comprises a telescopic lever 133 which is pivoted to the arm 130 by the pin 132 and which has two parts relatively movable and fixable in the same manner as the arm 130, there being a locking pin 134. The lever 133 has a curved end 135 of length 136. A portion 139 of the mechanism 131 is located in front of the pivotal shaft 132, with reference to the intended travelling direction I, and is formed by an extension of lever 133 forwardly from the pin 132. A tension spring 137 is connected at one end to the extension 139 and at the other end to the arm 130. The spring 137 tends to turn the mechanism 131 in the direction of the arrow 138 about the pin 132. A nose 131A formed on the extension 139 constitutes a stop to prevent the mechanism 131 from moving past a certain position relative to the arm 130.

The extension 139 is formed with a plurality of holes 139A, in any desired one of which the vertically downwardly bent end 141 of a rod 140 may be remote from the end 141, is screwthreaded and is screwed into the tapped end of a tube 142. The end of a rod 143 is similarly screwed into the other tapped end of the tube 142, the rods 140 and 143 being aligned and having screwthreading in opposite senses. Thus the length of the assembly of parts 140, 142 and 143 is adjustable by turning the tube 142 about its axis. The rod 143 is vertically downwardly bent at its free end 144 and is inserted in a hole 34A in the annulus 34, to which the masking plates 32 and 33 are secured. In this case, the annulus 34 is not provided with a fixing mechanism like that shown in FIGURE 1 comprising the arm 37 with the plate 39.

The device shown in FIGURES 9 and 10 may be employed for example in orchards, where the trees are at relatively fairly great distances from each other. The regulating mechanism is arranged to open the outlet ports 24 and 25 at the necessary instants so that the material to be spread, for example fertilizer, is spread only in the proximity of the trees and is not wasted by falls to the ground in between the trees. When the device is propelled in the direction I, the tractor is driven so that the rear end of the lever 133 is located between the trees of one row. The device is moved parallel to that row. When a tree, for example the tree 145 in FIGURE 9 is passed, the end of the lever 133 touches it, so that the lever 133 is turned about the pin 132 in the direction opposite the arrow 138. Consequently, the assembly of parts 140, 142 and 143 is moved in the direction of the arrow 146, so that the annulus 34 and the masking plates 32 and 33 turn in the direction of the arrow 147 about the annulus 23. The arrangement is such that this turning movement opens the ports 24 and 25, so that the material pass the ejector member. The material is thereby ejected through the distributing nozzles of the guide member 101. The arm 130, and the mechanism 131 with the lever 133, are arranged so that the material ejected by the ejector member at the instant when the lever 133 is moved by the tree 145, is directed in the proximity of the tree 145 by the distributing nozzle on the right-hand side of the device. This nozzle causes the material to be spread to the right and slightly to the rear, but almost perpendicularly to the travelling direction I. The left-hand nozzle spreads material at the same instant in opposite direction, so that this material is ejected to the left at an angle of almost to the direction I, but slightly to the front. This spreading of material in opposite directions ensures that the material is directed on both sides of the device near to the trees when the trees of two adjacent rows are in staggered positions.

The directions of spreading of the material are dependent upon the positions of the distributing nozzles. It will be apparent that, if necessary, the material may be spread in two opposite directions each being at an angle of exactly 90° to the travelling direction I, by suitable positioning of the nozzles.

The duration of opening of the outlet ports 24 and 25 is dependent upon the length 136 of the curved end 135 of the lever 133. The curved end 135 is arranged so that, while passing the tree 145, it remains approximately parallel to the travelling direction I, so that the assembly of parts 140, 142 and 143 is held in fixed position relative to the frame during the travel by the tree, so that also the plates 32 and 33 are held in fixed position relative to th ports 24 and 25. As long as the end 135 contacts and moves across the trunk of the tree, the ports 24 and 25 remain open, but when the end 135 has passed the tree 145, the spring 137 draws the mechanism 131 in the direction of the arrow 138 about the pin 132, the masking plates 32 and 33 then again closing the ports 24 and 25, until the end 135 contacts the next tree. It will be obvious that the greater the distance 136, the longer the ports 24 and 25 remain opened.

The amount to which the ports 24 and 25 are opened by the plates 32 and 33, is determined by the angle through which the annulus 34 with the plates 32 and 33 is turned in the direction of the arrow 147 by the rod 143. This turn of the annulus 34 depends upon the distance moved about the pin 132 by the end of the rod 140 connected with the extension 139 of the lever 133. This in turn is dependent upon by the distance 148 between the vertical end 141 and the pin 132, which distance can be adjusted by connecting the end 141 of the rod 140 with a desired one of the holes 139A in the extension 139. In this way, the quantity of material ejected when the ports 24 and 25 are opened, can be regulated.

FIGURES 11 and 12 show an ejector member 150, which may be used in the device shown in the preceding figures for spreading the material. The ejector member 150 comprises a horizontal plate 151, on which sixteen blades or ejecting arms 152 are provided. The plate 151 is secured by bolts 154 to a triangular plate 153 which is fastened to the shaft 4. The blades 152 are curved and their outer ends 156 extend to the peripheral edge of the plate 151, whereas the inner ends 157 of the blades are located on a circle close to the annulus 23. Thus the ends 157 of the blades move, in operation, close to the annulus 23 with the ports 24 and 25 and are just clear of the outer faces of the masking plates 32 and 33. A radius drawn from the center 158 of the ejector member to the outer end 156 of a blade, passes through the inner end 157 of an adjacent blade. Thus the angle 155 between radii drawn through adjacent ends 156 is equal to the angle between radii drawn through the ends 156 and 157 of a single blade, this angle being 22½°. The blades 152 are curved so that the ends 156 are aproximately tangential to a circle centered on the axis of the shaft 4. With respect to the intended direction of operative rotation 159 of the ejector member, the blades are curved so that the inner ends 157 precede the outer ends 156. Each blade 152 has an upright side 160 which is perpendicular to the plate 151, and which is bent over at its upper edge to form a flange 161 approximately parallel to the plate 151. The flange 161 extends forwardly from the side 160 with reference to the direction 159.

The blades have a height 162 which is approximately equal to the height of the outlet ports 24 and 25. Since the inner ends 157 of a relatively large number of blades 152 are caused to move close to the ports 24 and 25, a small quantity of material will constantly be fed to the end 157 of each of the rapidly moving blades. Thus the direction in which the material is ejected, when it leaves the blades, at the circumference of the disc 151, can be adjusted so that the material leaves the ejector member over a small circumferential angle, dependent upon the width of the opened ports 24 and 25. Thus the material can be directed towards the places where the material is required with little wastage due to too wide spreading. The ejector member 150 can therefore be employed successfully in the devices comprising the guide members as described above, since the ejector member 150 is capable of effectively ejecting the material through the distributing nozzles of the guide members, for example the nozzles 53 and 61 of the guide member 44. For effective ejection there must be at least about twelve of the blades 152.

The foregoing detailed description of various embodiments of the invention has been given for clearness of understanding only, and no unnecessary limitations should be understood therefrom, for modifications will be obvious to those skilled in the art.

What we claim is:

1. A device for spreading material which comprises a frame, a container for said material mounted on said frame, a spreading member for ejecting said material operatively associated with said container to receive said material therefrom, said container having one or more outlets leading from said container to said spreading member, closing means for said outlets, a regulating means being operatively connected with said closing means, whereby delivery of material from said outlets is controlled by said regulating means, said regulating means including sensing means, said sensing means actuated by features of the terrain over which said device operates to control selectively delivery of material from said outlets.

2. A device as claimed in claim 1 wherein said sensing means includes a laterally projecting arm from said device, a control mechanism movably arranged on said arm, resilient means urging said mechanism into a predetermined position relative to said arm, said mechanism movable from said predetermined position upon encountering obstacles on the terrain over which said device operates, and coupling means coupling said mechanism with said closing means, whereby delivery of said material from said outlets is selectively controlled.

3. A device as claimed in claim 2 wherein said control mechanism includes a lever, there being a substantially vertical pivot means pivotally connecting said lever to said arm near the end of said arm away from said spreading member, the location of said latter connection being selectively variable, said coupling means comprising rod means connected at one end to said lever and at the other to said closing means.

4. A device as claimed in claim 3 wherein there is a contacting part of said control mechanism which comes into contact with obstacles on the terrain over which said device operates, the length of said contacting part being selectively variable.

5. A device for spreading material which comprises a frame, a container for said material mounted on said frame, a spreading member for ejecting said material operatively associated with said container to receive material therefrom, said spreading member rotatable about an axis, outlets in the lower end of the container near said spreading member, a guide member for guiding said material ejected from said spreading member arranged around said spreading member, said guide member having only two outlet areas, said outlet areas being offset about said axis of rotation substantially 180° from each other, said outlet areas each in communication with said spreading member whereby material ejected from said spreading member discharges out of said outlet areas, said guide member being comprised of two parts, hinge means connecting said parts, coupling means being included on each part of said guide member for removably coupling same to said frame, fixing means holding said parts of said guide member together and securing said guide member against movement relative to the frame.

6. The invention of claim 5 wherein a removable rod secures the parts of the guide member together and the fixing means includes bent-over bracket elements which engage the frame.

7. A device for spreading material which comprises a frame, a container for said material mounted on the frame, a spreading member for ejecting said material operatively associated with said container to receive material therefrom, said spreading member rotatable about an axis, outlets in the lower end of the container near said spreading member, a guide member for guiding said material ejected from said spreading member arranged around said spreading member, said guiding member having two outlet areas, said outlet areas being offset about said axis of rotation substantially 180° from each other, said outlet areas each in communication with said spreading member whereby material ejected from said spreading member discharges out of said outlet areas, a distributing nozzle extending from each of said outlet areas, said nozzle including an upper plate and said guide member including an upper plate which is integral with the upper plate of said nozzles, deflector flaps being associated with said nozzles, the position of said flaps being adjustable to a plurality of positions about a substantially horizontal axis, said guide member being comprised of two parts, hinge means connecting said parts, coupling means being included on each part of said guide member for removably coupling same to said frame, fixing means holding said parts of said guide member together and securing said guide member against movement relative to the frame.

8. A device in accordance with claim 7 wherein said nozzle includes forward and after rim members, the distance between said rim members increasing as the distance from said outlet areas increases in each of said nozzles, one of said rim members being substantially straight and the other curved.

References Cited by the Examiner
UNITED STATES PATENTS

| | | | |
|---|---|---|---|
| 922,028 | 5/09 | Parrish | 275—8 |
| 1,107,992 | 8/14 | Parrish | 275—8 |
| 1,166,477 | 1/16 | Parrish | 275—15 |
| 2,418,546 | 4/47 | Comtois | 275—8 |
| 2,874,878 | 2/59 | Stokland. | |

FOREIGN PATENTS

| | | |
|---|---|---|
| 159,534 | 10/54 | Australia. |
| 615,034 | 2/61 | Canada. |

ABRAHAM G. STONE, *Primary Examiner.*

A. JOSEPH GOLDBERG, T. GRAHAM CRAVER, WILLIAM A. SMITH, III, *Examiners.*